(12) United States Patent
Ciochina-Duchesne et al.

(10) Patent No.: US 11,050,595 B2
(45) Date of Patent: Jun. 29, 2021

(54) REFERENCE SIGNAL FOR PHASE TRACKING INSERTION

(71) Applicant: MITSUBISHI ELECTRIC CORPORATION, Tokyo (JP)

(72) Inventors: Cristina Ciochina-Duchesne, Rennes (FR); Fumihiro Hasegawa, Tokyo (JP); Akihiro Okazaki, Tokyo (JP); Akinori Taira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/480,597

(22) PCT Filed: Dec. 27, 2017

(86) PCT No.: PCT/JP2017/047422
§ 371 (c)(1),
(2) Date: Jul. 24, 2019

(87) PCT Pub. No.: WO2018/173417
PCT Pub. Date: Sep. 27, 2018

(65) Prior Publication Data
US 2020/0007369 A1 Jan. 2, 2020

(30) Foreign Application Priority Data
Mar. 22, 2017 (EP) ...................................... 17305320

(51) Int. Cl.
*H04L 27/26* (2006.01)
(52) U.S. Cl.
CPC ...... *H04L 27/2613* (2013.01); *H04L 27/2607* (2013.01); *H04L 27/2636* (2013.01)

(58) Field of Classification Search
CPC ....... H04L 5/0048; H04L 5/001; H04L 27/26; H04L 27/2613; H04L 27/2607; H04L 27/2636; H04W 72/044; H04B 7/0413
See application file for complete search history.

(56) References Cited

U.S. PATENT DOCUMENTS 9,692,692 B1* 6/2017 Vairavakkalai ....... H04L 45/025
2006/0140308 A1* 6/2006 MacFarlane Shearer, III ............
H04L 27/2657
375/326
2019/0356515 A1* 11/2019 Murakami ............ H04W 52/16

FOREIGN PATENT DOCUMENTS

WO    WO 2015/153173 A1    10/2015
WO    WO 2016/118929 A2    7/2016

OTHER PUBLICATIONS

Japanese Office Action, dated Sep. 8, 2020, for Japanese Application No. 2019-536232, with an English Translation.
(Continued)

*Primary Examiner* — Wei Zhao
(74) *Attorney, Agent, or Firm* — Birch, Stewart, Kolasch & Birch, LLP

(57) ABSTRACT

The present invention relates to a method implemented by computer means of a communicating entity, for inserting a reference signal for phase tracking, said communicating entity using a discrete Fourier transformation spread orthogonal frequency division multiplexing modulator, characterized in that the method comprises:
   obtaining a succession of signal samples by inserting said reference signal for phase tracking within a succession of data samples, according to at least one insertion pattern chosen among pre-defined patterns with respect to predetermined criteria of communication conditions, and
   feeding said modulator with a succession of signal blocks obtained from said succession of signal samples, so as
(Continued)

to apply the discrete Fourier transformation after the insertion of the reference signal for phase tracking.

15 Claims, 9 Drawing Sheets

(56) References Cited

OTHER PUBLICATIONS

Qualcomm Incorporated, "Phase and frequency tracking reference signal considerations", 3GPP TSG-RAN WG1 #88, R1-1702617, Feb. 13-17, 2017, Athens, Greece, 7 pages.
Ericsson, "On phase tracking in DFT-S-OFDM waveform", R1-1612338, 3GPP TSG-RAN WG1#87, Reno, USA, Nov. 14-18, 2016, total 2 pages.
Mitsubishi Electric, "On phase and frequency tracking for DFTsOFDM", R1-1703215, 3GPP TSG-RAN WG1 #88, Athens, Greece, Feb. 13-17, 2017, total 3 pages.
Samsung "Data and Control Multiplexing in DFT-S-OFDM", R1-051039, 3GPP TSG RAN WG1 Meeting #42bis, San Diego, USA, Oct. 10-14, 2005, p. 1-5.
CMCC, "Phase-Tracking Reference Signal Design for High-Frequency Systems," 3GPP TSG RAN WG1 NR Ad-Hoc Meeting, R1-1700438, Spokane, USA, Jan. 16-20, 2017, pp. 1-11.
Korean Office Action for Korean Application No. 10-2019-7026903, dated Mar. 17, 2021, with English translation.

* cited by examiner

REFERENCE SIGNAL FOR PHASE TRACKING INSERTION

TECHNICAL FIELD

The present invention relates to telecommunications, and more specifically to a method to support for compensation of time domain phase variations.

BACKGROUND ART

Phase variations in the time domain can be caused by various phenomena. For example the presence of phase noise, frequency drifts due to Doppler shift or insufficient frequency synchronization can produce phase variations in the time domain.

SUMMARY OF INVENTION

Technical Problem

Orthogonal Frequency Division Multiplexing (OFDM) systems appear to be quite sensitive to phase noise. For instance, it can be noticed that OFDM systems are more sensitive to phase noise than single-carrier systems. That is part of the reason that systems being subject to important phase noise environment avoid the use of OFDM waveforms. Satellite systems are an example of systems that are particularly subject to challenging phase noise environments.

Time domain effects appear to be easier to monitor and compensate in the time domain rather than in the frequency domain. Time domain training sequences are recognized to be particularly effective for phase noise compensation and carrier offset compensation.

Discrete Fourier Transformation spread Orthogonal Frequency Division Multiplexing (DFTsOFDM) waveform corresponds to blocks of bit interleaved and coded modulation symbols that are pre-coded by a Discrete Fourier Transformation (DFT). The number of modulation symbols in the block corresponds to the DFT size and to the number of active subcarriers. Then subcarrier mapping is performed so that an Inverse Discrete Fourier Transform (IDFT) can be performed as well. For example, blocks of M bit interleaved and coded modulation symbols are precoded by an M sized DFT, mapped to M out of N subcarriers and then passed through an N sized IDFT. A cyclic prefix (CP) can be optionally appended after the IDFT. In that case, it is referred as cyclic prefix Discrete Fourier Transformation spread Orthogonal Frequency Division Multiplexing (CP DFTsOFDM). CP DFTsOFDM has been used as the uplink (UL) waveform in Long-Term-Evolution/Long-Term-Evolution Advanced (LTE/LTE-A) systems. CP DFTsOFDM will be used as one of the UL waveforms in 5G New Radio (5G NR) systems. One of its fundamental properties is the low peak to average power ratio (PAPR) allowing a user equipment (UE) to use its high power amplifier (HPA) in an energy efficient manner near its saturation point.

Modulation symbols obtained from a single codeword may spread several DFTsOFDM blocks, generally contained within a scheduling unit. A scheduling unit that can be for example a slot, a minislot in NR 5G or a subframe in LTE-LTE-A is formed by blocks containing reference signal for demodulation and blocks not containing reference signal for demodulation.

There is a need of sequences serving as support in order to compensate phase variations in the time domain for millimeter (mm) wave systems that are subject to relatively important phase noise environment. Such sequences can also be used for compensating residual Carrier Frequency Offset (CFO) or effects due to Doppler shifts. For example, such sequences can compensate high velocity in low dispersive channels. For OFDM systems, it is known to insert a sequence at the subcarrier level (in the frequency domain). The advantage of such sequence inserted in the frequency domain is that it provides support for relatively simple estimation of phase variations during frequency-domain processing at the receiver side. However, the inconvenient is that frequency domain observation of a time domain effect cannot be performed with a finer granularity than one OFDM symbol.

Regarding DFTsOFDM, reference signal for phase tracking can also be inserted in the frequency domain at subcarrier level. In such cases, reference signal for phase tracking can either be inserted onto carriers non-occupied by data or can puncture occupied subcarriers. Both insertions types of reference signal for phase tracking for DFTsOFDM, in the frequency domain, lead to degraded PAPR. Another drawback of inserting reference signal for phase tracking in the frequency domain onto carriers non-occupied by data is that DFTs of different sizes need to be implemented. Another drawback of inserting reference signal for phase tracking in the frequency domain by puncturing occupied subcarriers, is that it can lead to a decrease of demodulation performance.

As a consequence, there is a need to explore further reference signal for phase tracking insertion for DFTsOFDM.

The present invention aims to improve the situation.

Solution to Problem

The invention relates to a method implemented by computer means of a communicating entity, for inserting a reference signal for phase tracking, said communicating entity using a discrete Fourier transformation spread orthogonal frequency division multiplexing modulator. In particular, the method comprises:
  obtaining a succession of signal samples by inserting said reference signal for phase tracking within a succession of data samples, according to at least one insertion pattern chosen among pre-defined patterns with respect to predetermined criteria of communication conditions, and
  feeding said modulator with a succession of signal blocks obtained from said succession of signal samples, so as to apply the discrete Fourier transformation after the insertion of the reference signal for phase tracking.

It is meant by "pattern" here above a predetermined combination of positions intended to be occupied by reference signal for phase tracking in the aforesaid succession of signal samples, and the insertion of the reference signal for phase tracking is then performed in the time domain, prior to the DFT application.

It is meant by "data samples" a succession of samples in the time domain including the bit interleaved coded modulation symbols to be transferred during the transmission. For simplicity, it is also included here any other reference signal samples other than reference signals for phase tracking if included before the DFT, when configured (e.g. mobility reference signals, reference signals for fine time/frequency tracking of the channel, additional demodulation reference symbols, etc.). "Signal samples" are obtained after insertion of the reference signal for phase tracking within the data samples succession, still in the time domain. A succession of "Signal blocks" are then obtained from that signal sample succession and are applied to the DFTsOFDM modulator. Usually, the DFTsOFDM modulator is implemented in the frequency domain and it implements at least a discrete Fourier transformation, then a mapping, then an inverse discrete Fourier transformation. Equivalent time-domain implementations of the DFTsOFDM modulation also exist but are usually not used in practical implementations due to a lack of flexibility and a higher complexity.

Therefore, support for time domain phase error compensation is provided thanks to reference signal for phase tracking insertion according to an insertion pattern. Moreover, advantageously the choice of pattern among predefined patterns is performed according to predetermined criteria of communication conditions. Thus, the pattern that suits best the communication conditions can be selected.

In an embodiment, one of the predetermined criteria of communication conditions is at least one of the following:
   scheduled bandwidth;
   modulation;
   coding rate;
   carrier frequency;
   physical resource block bundling; or
   other reference signal densities.

Therefore, implicit or low signaling pattern insertion choice can be performed.

In an embodiment, a reference signal for demodulation is further inserted within a transformed succession of signal blocks which results, in the frequency domain, at least from the application of the discrete Fourier transformation to the succession of signal blocks. This reference signal for demodulation is inserted in scheduled positions of the transformed succession of signal blocks, but however the applied pattern for reference signal for phase tracking insertion takes into account these scheduled positions.

Therefore, since reference signal for demodulation can serve as support for phase error compensation, taking into account reference signal for demodulation position enables not to insert reference signal for phase tracking closely to reference signal for demodulation so it limits the penalty in maximum attainable throughput.

In an embodiment, transformed succession of signal blocks includes $N_{data}$ transformed signal blocks, each transformed signal block being mapped to M active subcarriers. The chosen pattern can be defined therefore by $N_k$ groups of $K_i$ reference signal for phase tracking separated by $D_i$ data samples, such as:

$$\sum_{i=0}^{N_k-1} K_i + \sum_{i=0}^{N_k} D_i = MN_{data}$$

where $D_i$ are non-null positive integers when i is different from 0 and $N_k$.

In such an embodiment, controlling the values of $K_i$, enables controlling, at the receiver side, the accuracy of the phase error estimate based on the group of $K_i$ reference signal for phase tracking. Controlling the values of $D_i$ enables further to control the accuracy of the interpolation between groups of reference signal for phase tracking at the receiver side.

In an embodiment: $D_0 = D_{N_K} = 0$.
In an embodiment: $D_1 = D_2 = \ldots = D_{N_K-1}$.

Therefore, the time domain distance between two groups of reference signal for phase tracking is equal and can be set according to a given phase noise variation degree.

In an embodiment: $K_0 = K_1 = \ldots = K_{N_K-1}$. Therefore, estimation on each group of reference signal for phase tracking is equally reliable.

In an alternative embodiment: $K_1 = \ldots = K_{N_K-2} = K_0 + K_{N_K-1}$.

In an embodiment: $(D_0 + \Sigma_{i=0}^{k}(K_i + D_{i+1}))$ mod $M = D_0$ mod M, for each k from 0 to $N_{k-2}$. In this embodiment, reference signal for phase tracking group starts at the same relative position with respect to the beginning of the signal block in each signal block where the sequence is present and thus allows easier de-mapping implementation.

In an embodiment, $(\Sigma_{i=0}^{k} = (D_i + K_i))$ mod $M = (D_0 + K_0)$ mod M for each k from 0 to $N_{K-1}$.

Therefore, the reference signal for phase tracking group ends at the same relative position with respect to the beginning of the signal block for easier de-mapping implementation.

In an embodiment: $K_i + D_{i+1} = K_{Nk-1} + D_{Nk} + D_0 = \Delta$ for each k from 0 to $N_{k-2}$, where either:
   $\Delta = M$; or
   $\Delta < M$; or
   $\Delta > M$.

In this embodiment, if $\Delta < M$, frequent insertion allows reliable interpolation among reference signal for phase tracking groups. If $\Delta > M$, reference signal for phase tracking overhead $K_{tot}/MN_{data}$ can be reduced by less frequent insertion of reference signal for phase tracking groups, where $K_{tot} = \Sigma_{i=0}^{N_k-1} K_i$. Finally, if $\Delta = M$, equally reliable phase estimation can be performed in each signal block.

In an embodiment, a non-null cyclic prefix, CP, is inserted after the inverse discrete Fourier transformation which is carried out by the modulator after the discrete Fourier transformation, and here $D_i$ (with $i = 1 \ldots N_{K-1}$) can take one of two values:
   a chosen integer D', if $D_i$ does not span across two signal blocks, or
   $D'' = D' - E(N_{CP} * M/N)$, if $D_i$ spans across two signal blocks (where $N_{CP}$ corresponds to a number of CP samples appended after the inverse discrete Fourier transformation, and E(x) designates the closest integer to x, N corresponding to the number of subcarriers related to the inverse discrete Fourier transformation).
In a variant, E(x) designates the closest integer inferior to x.
In another variant, E(x) designates the closest integer superior to x.

Therefore, regular insertion is obtained after CP insertion and it enables time domain processing before discrete Fourier transformation at the receiver side.

In an embodiment, $D_i$ can be chosen so as to avoid reference signal for phase tracking insertion in signal blocks having positions scheduled for reference signal for demodulation or for other reference signal allowing phase tracking (in the frequency domain, or possibly in the time domain according to the present invention).

Another aspect of the invention relates to a telecommunication device, using a discrete Fourier transformation spread orthogonal frequency division multiplexing modulator, the device comprising a computer circuit for inserting a reference signal for phase tracking and more particularly for:
   obtaining a succession of signal samples by inserting said reference signal for phase tracking within a succession of data samples, according to at least one insertion pattern chosen among pre-defined patterns with respect to predetermined criteria of communication conditions, and feeding said modulator with a succession of signal blocks obtained from said succession of signal samples, so as to apply the discrete Fourier transformation after the insertion of the reference signal for phase tracking.

A third aspect of the invention relates to a computer program product, comprising instructions for performing the method previously described, when run by a processor.

Other features and advantages of the method and device disclosed herein will become apparent from the following description of non-limiting embodiments, with reference to the appended drawings.

The present invention is illustrated by way of example, and not by way of limitation, in the figures of the accompanying drawings, in which like reference numerals refer to similar elements.

DESCRIPTION OF EMBODIMENTS

Figure 1:
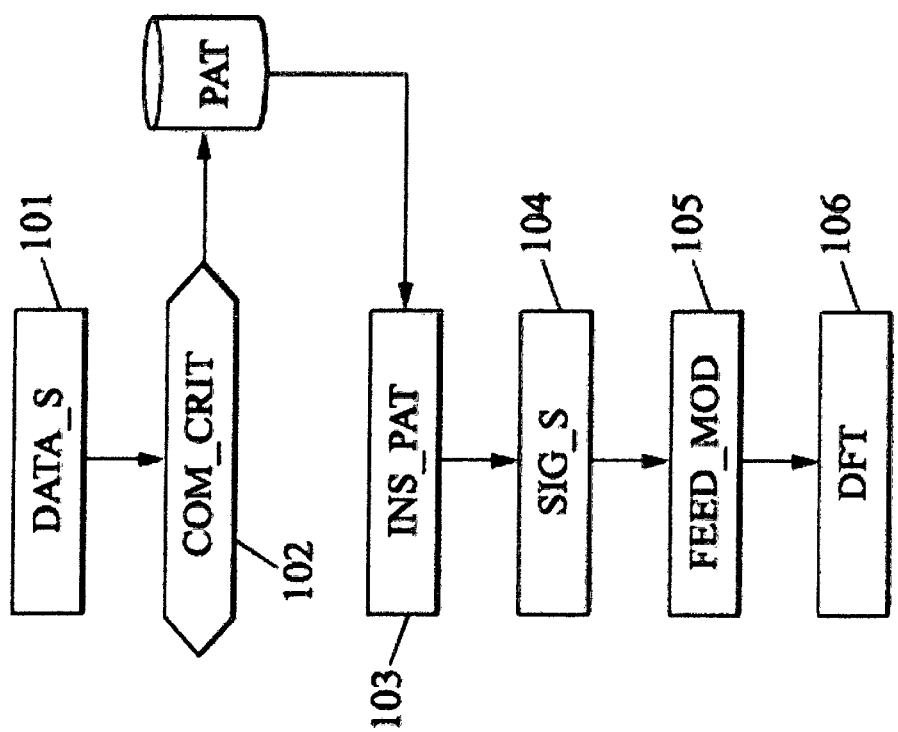
FIG. 1 is a flow chart illustrating the different steps of the reference signal for phase tracking insertion method.

FIG. 1 is a flow chart illustrating the different steps of the reference signal for a phase tracking insertion method according to a possible embodiment of the present invention.

A data samples succession that represents a set of data DATA_S 101 may be modified by inserting therein a reference signal for phase tracking. That insertion follows a chosen pattern selected among a collection of patterns (patterns and pattern combinations as presented below). The selection of a particular pattern can be performed according to communication criteria COM_CRIT 102. Communication criteria COM_CRIT 102 may enable thus the choice of an insertion pattern INS_PAT 103 for reference signal for phase tracking. Therefore, data sample may be modified into signal sample SIG_S 104 when reference signal for phase tracking is inserted according to the chosen insertion pattern PAT. Signal blocks can be obtained from signal sample 104 in order to feed a discrete Fourier transformation spread orthogonal frequency division multiplexing modulator FEED_MOD 105 with said signal blocks, the modulation staring with a discrete Fourier transformation DFT 106.

The choice of insertion pattern PAT is based on communication criteria COM_CRIT 102 such as the allocation size M (or equivalently the scheduled telecommunication bandwidth), the modulation type, the coding rate, the carrier frequency, the PRB (physical resource block) bundling, and/or other reference signal densities. Furthermore, a combination of preexisting patterns can be chosen as well.

Figure 2:
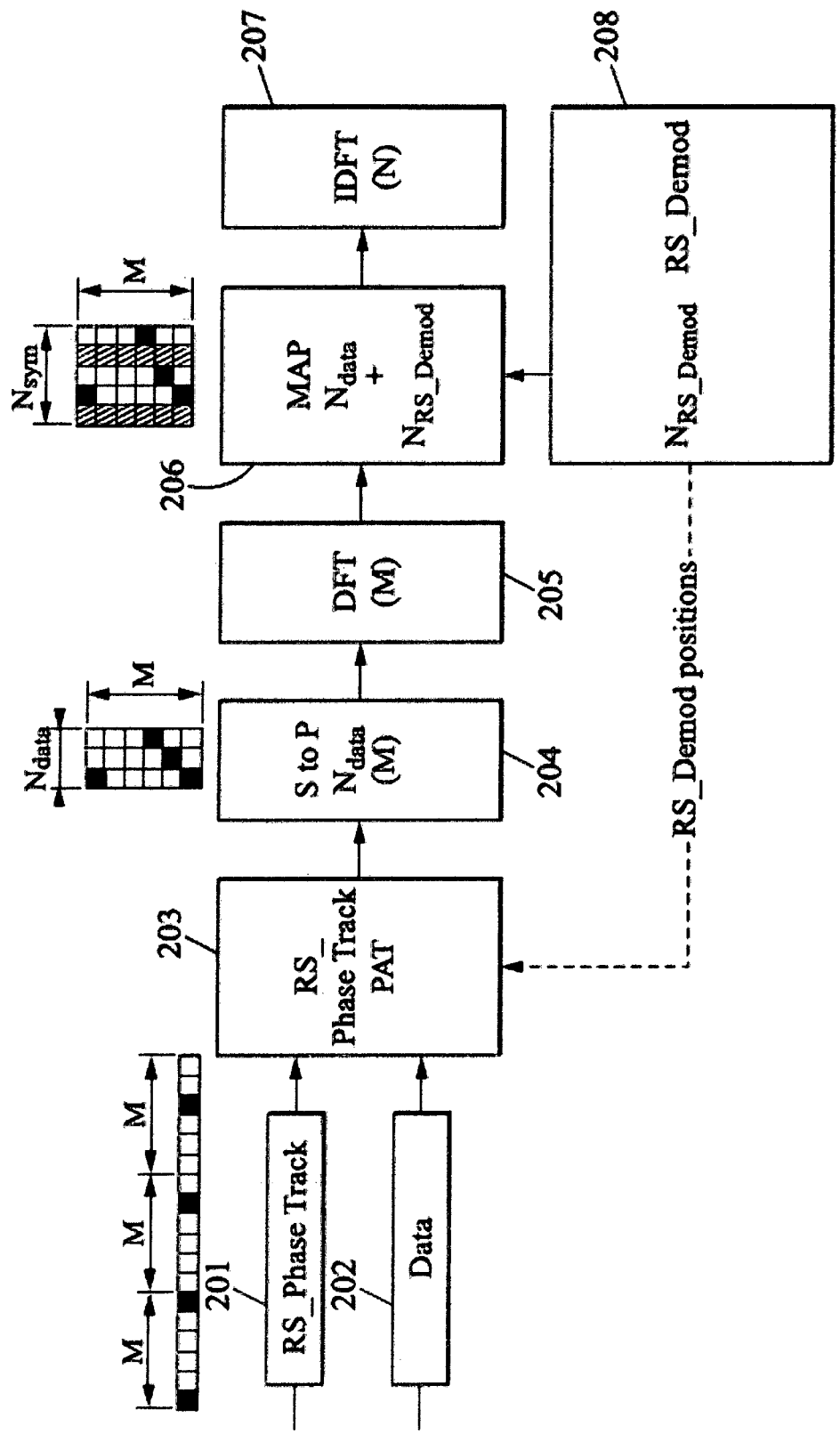
FIG. 2 is an example of a representation of reference signal for phase tracking insertion.

FIG. 2 is an example of a representation of reference signal for phase tracking insertion according to a possible embodiment of the present invention. More particularly, FIG. 2 represents an insertion of K reference signal for phase tracking symbols in one discrete Fourier transformation spread orthogonal frequency division multiplexing symbol carrying reference signal for phase tracking.

In FIG. 2, reference signal for phase tracking RS_Phase Track 201 and data samples Data 202 are fed to a reference signal for phase tracking insertion module RS_PhaseTrack PAT 203, which is inserting said reference signal for phase tracking within the succession of data samples, according to at least one insertion pattern.

A scheduling unit such as a minislot, slot or other unit is considered. The scheduling unit contains $N_{sym}$ blocks among which $N_{data}$ signal blocks do not contain any reference signal for demodulation. Each of the $N_{data}$ signal blocks will be mapped to M active carriers. In module 204, $N_{data}$ signal blocks of M signal samples can be created. Each block is therefore M sized hereafter. Module 205 can apply then a discrete Fourier transformation to the $N_{data}$ signal blocks of M signal samples. Subcarrier mapping of $N_{data}$ and $N_{RS\_Demod}$ blocks can be performed in module 206 before application of an inverse discrete Fourier transformation IDFT 207. $N_{RS\_Demod}$ blocks correspond to blocks comprising reference signals for demodulation.

In FIG. 2, the reference signal for demodulation RS_Demod positions are represented by full pilots in module 206. However hybrid data/pilot symbols is another possible alternative, with reference signal for demodulation insertion before or after application of a discrete Fourier transformation 205 (DFT). Cyclic prefix (CP) may be appended after the inverse discrete Fourier transformation 207.

Reference signal for phase tracking insertion can offer support for time-domain phase error compensation. However, inserting reference signal for phase tracking may bring a penalty in terms of maximum attainable throughput.

For this reason, reference signal for phase tracking density should not exceed the minimum density necessary for attaining a performance target. Since other reference signals such as reference signal for demodulation, or other reference signals, when configured (e.g. mobility reference signals, reference signals for fine time/frequency tracking of the channel, additional demodulation reference symbols, etc.) can be used as support for phase error compensation, there may not always be a need to insert reference signal for phase tracking.

Figure 3:
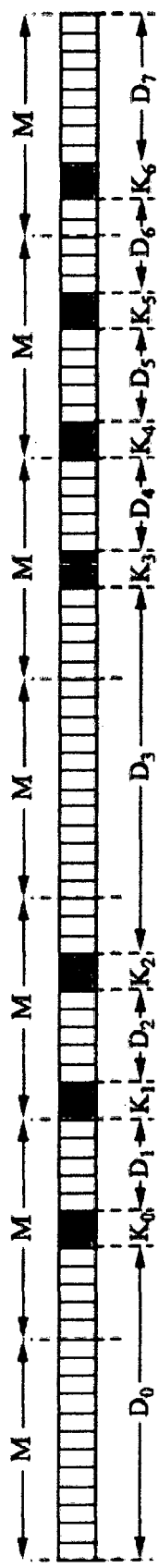
FIG. 3 is an example of an insertion pattern.

FIG. 3 is an example of an insertion pattern according to a possible embodiment of the present invention. The pattern is composed of Nk groups of Ki reference signal for phase tracking separated by Di data sample, such as:

$$\sum_{i=0}^{N_k-1} K_i + \sum_{i=0}^{N_k} D_i = MN_{data}$$

where $D_i$ are non-null positive integers when i is different from 0 and $N_k$.

The number of inserted reference signal for phase tracking is $K_{tot}=\Sigma_{i=0}^{N_k-1}K_i$ for a total reference signal for phase tracking overhead of $K_{tot}/MN_{data}$.

When applying a discrete Fourier transformation, data samples and reference signal for phase tracking are spread together. Due to multipath channel, interference may exist between data sample and reference signal for phase tracking at the receiver side.

For a given reference signal for phase tracking overhead, small values of $K_i$ may allow finer granularity of reference signal for phase tracking insertion (small $D_i$), profitable at the receiver side to interpolation among reference signal for phase tracking groups.

However, phase estimation on each reference signal for phase tracking group may be degraded due to interference with data samples. In that case, the minimum value of Ki may be superior to a threshold so that reliable averaging is possible.

Large reference signal for phase tracking groups may allow reliable phase estimation within a group with limited noise/interference. However, if the reference signal for phase tracking overhead may be kept reasonable then groups of reference signal for phase tracking may be rather spaced and it may result in large $D_i$ values. In that case, interpolation between reference signal for phase tracking groups may be less reliable.

A compromise between minimum $K_i$ and Maximum $D_i$, where i goes from 0 to $N_k-1$ under constraint of overhead $K_{tot}/MN_{data}$ can be implemented.

Other insertion pattern can be defined, for example with $K_0=K_1=\ldots=K_{N_K-1}$. This pattern may allow equally reliable estimation on each group of reference signal for phase tracking.

Another possible insertion pattern can be defined with $K_1=\ldots=K_{N_K-2}=K_0+K_{N_K-1}$, and $D_0=D_{N_K}=0$. A variant of insertion pattern is a cyclic shift of above insertion patterns.

Another possible insertion pattern can be defined with the following formula: $(D_0+\Sigma_{i=0}^{k}(K_i+D_{i+1}))$ mod $M=D_0$ mod M where k goes from 0 to $N_{k-2}$ or any cyclic shift of this pattern. Therefore, the reference signal for phase tracking group starts at the same relative position with respect to the beginning of the signal block in each signal block where the reference signal for phase tracking is present. Easier de-mapping implementation is thus allowed. This pattern can be combined with other features, for example:

$N_K=N_{data}$, thus one reference signal for phase tracking group can be present in every data block, $K_i$ can depend on the distance to the closest position containing other reference signal that may be used for phase estimation, $K_1=\ldots=K_{N_K-2}=K_0+K_{N_K-1}$ or $K_0=K_1=\ldots=K_{N_K-1}$, $(\Sigma_{i=0}^{k}(D_i+K_i))$ mod $M=(D_0+K_0)$ mod M, where k goes from 0 to $N_{k-1}$ can define another possible insertion pattern. Any cyclic shift of this pattern is also a possible insertion pattern. Therefore, the reference signal for phase tracking group ends at the same relative position with respect to the beginning of the signal block for easier de-mapping implementation. This pattern can be combined with other features, for example:

$N_K=N_{data}$: one reference signal for phase tracking group can be present in every data block, $K_i$ can depend on the distance to the closest position containing other reference signal that can serve for phase estimation, and $K_1=\ldots=K_{N_K-2}=K_0+K_{N_K-1}$ or $K_0=K_1=\ldots=K_{N_K-1}$.

Equally spaced insertion patterns can be defined with the following formula $D_1=D_2=\ldots=D_{N_K-1}=D$. Any cyclic shift of this insertion pattern may also be a possibility. Therefore, the time domain distance between two reference signal for phase tracking groups may be equal and may be set according to the phase noise strength.

Figure 4:
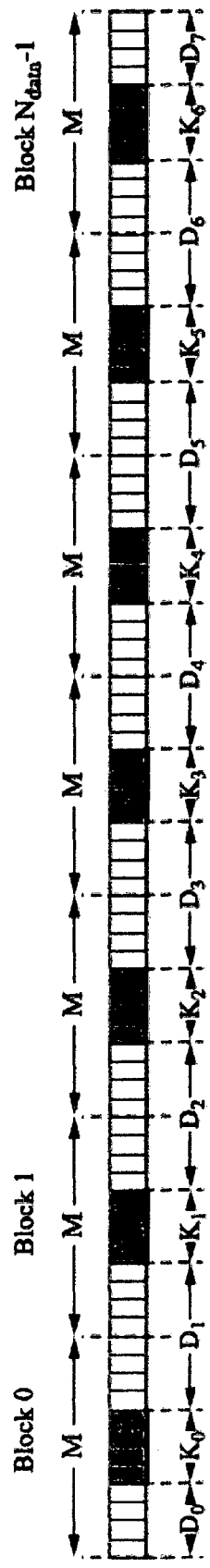
FIG. 4 is an example of an insertion pattern.

Regular insertion pattern may be defined with the following formula $K_i+D_{i+1}=K_{Nk-1}+D_{Nk}+D_0=\Delta$ where k goes from 0 to $N_{k-2}$. A variant of this pattern may be determined with $K_0=K_1=\ldots=K_{N_K-1}$. Different cases may be distinguished depending on the value of $\Delta$. FIG. 4 is an example of an insertion pattern according to a possible embodiment of the present invention. In FIG. 4, $\Delta=M$, therefore equally reliable phase estimation may be performed within each data symbol.

Figure 6:
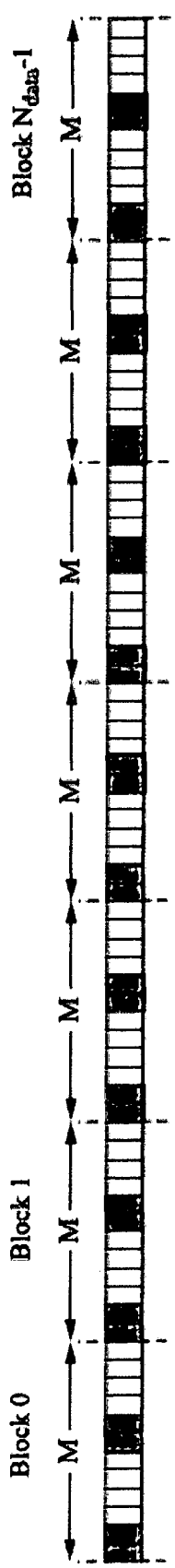
FIG. 6 is an example of an insertion pattern.

FIG. 6 is an example of an insertion pattern according to a possible embodiment of the present invention. In FIG. 6, $\Delta<M$, and frequent insertion may allow reliable interpolation among reference signal for phase tracking group.

Figure 8:
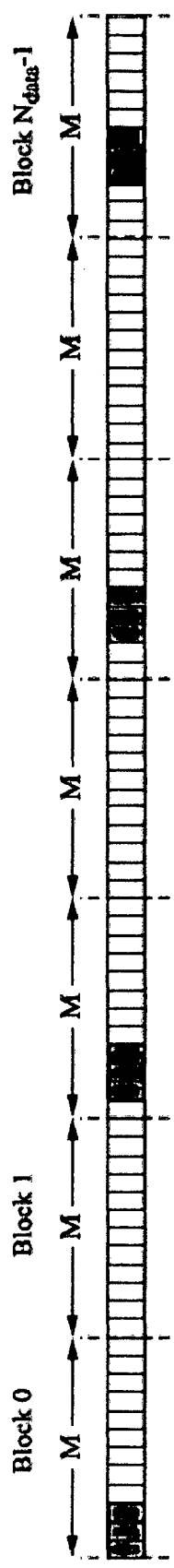
FIG. 8 is an example of an insertion pattern.

FIG. 8 is an example of an insertion pattern according to a possible embodiment of the present invention. In FIG. 8, $\Delta>M$, and reference signal for phase tracking overhead can be reduced.

Irregular insertion pattern can be implemented also when a non-null cyclic prefix is to be inserted after the inverse discrete Fourier transformation. The insertion pattern can be adapted to that case as well and $D_i$, $i=1\ldots N_{K-1}$ can take one of two values:

a chosen integer D', if $D_i$ does not span across two signal blocks, or $D''=D'-E(N_{CP}*M/N)$, if $D_i$ spans across two signal blocks, where $N_{CP}$ corresponds to a number of CP samples appended after the inverse discrete Fourier transformation, and E(x) designates the closest integer to x, N corresponding to the number of subcarriers related to the inverse discrete Fourier transformation. In a variant, E(x) designates the closest integer inferior to x. In another variant, E(x) designates the closest integer superior to x.

Figure 7:
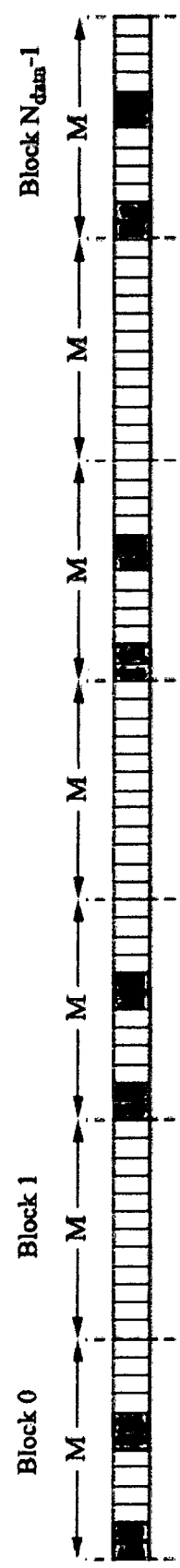
FIG. 7 is an example of an insertion pattern.

FIG. 7 shows an example of irregular insertion pattern since reference signal for phase tracking are not contained here within each M sized signal block. Thus, overhead is reduced.

Figure 5:
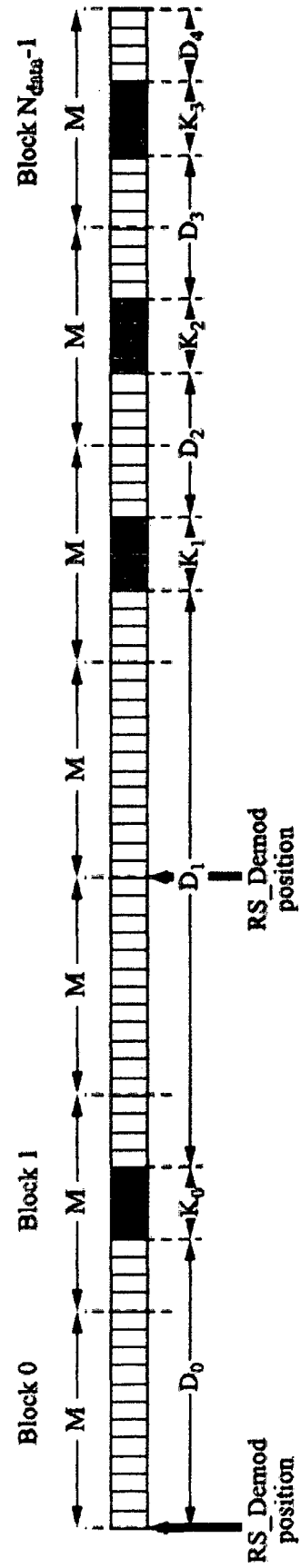
FIG. 5 is an example of an insertion pattern.

FIG. 5 is an example of an insertion pattern according to a possible embodiment of the present invention. Irregular insertion patterns may also be defined where Di is chosen so as to avoid reference signal for phase tracking insertion near reference signal for demodulation positions as it may be seen on FIG. 5. Therefore, reference signal for phase tracking density may be reduced by avoiding insertion where phase error may be corrected with low error by other means such as:

Signal blocks near reference signal for demodulation positions may not carry reference signal for phase tracking;

X signal blocks near reference signal for demodulation positions may not carry reference signal for phase tracking;

X signal blocks following reference signal for demodulation positions may not carry reference signal for phase tracking;

Y samples (Y<M) neighbouring reference signal for demodulation positions may not carry reference signal for phase tracking;

The irregular pattern may be obtained by removing reference signal for phase tracking positions from a regular pattern;

$K_i$ may depend on the distance to the closest position containing other reference signal that can serve for phase estimation;

$D_i$ may depend on the distance to the closest position containing other reference signal that can serve for phase estimation;

Y samples (Y<M) neighbouring positions containing other reference signal that can serve for phase estimation may not carry reference signal for phase tracking;

The signal block containing other reference signal that can serve for phase estimation may not carry reference signal for phase tracking;

X signal blocks neighbouring signal blocks containing other reference signal that can serve for phase estimation may not carry reference signal for phase tracking.

Irregular insertion pattern may also be obtained where $D_i$ is chosen so as to avoid reference signal for phase tracking insertion in certain signal blocks. Thus, reference signal for phase tracking overhead may be reduced. For example, reference signal for phase tracking may be inserted only every other signal block. For example, reference signal for phase tracking may be inserted only every Z (e.g. 3, 4) signal blocks.

As mentioned, a combination of insertion patterns may also be used. The insertion patterns mentioned before can be based on one mother insertion pattern, where dependent insertion patterns are characterized by different parameters.

Figure 9:
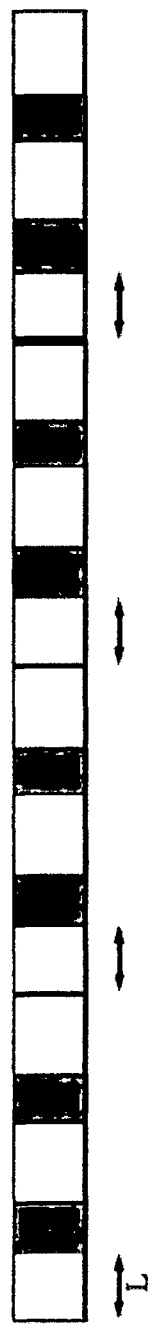
FIG. 9 is an example of an insertion pattern.

FIG. 9 is an example of an insertion pattern according to a possible embodiment of the present invention. More particularly, FIG. 9 represents a mother pattern with a variable offset L which can be introduced to any of the previous patterns defined.

Figure 11:
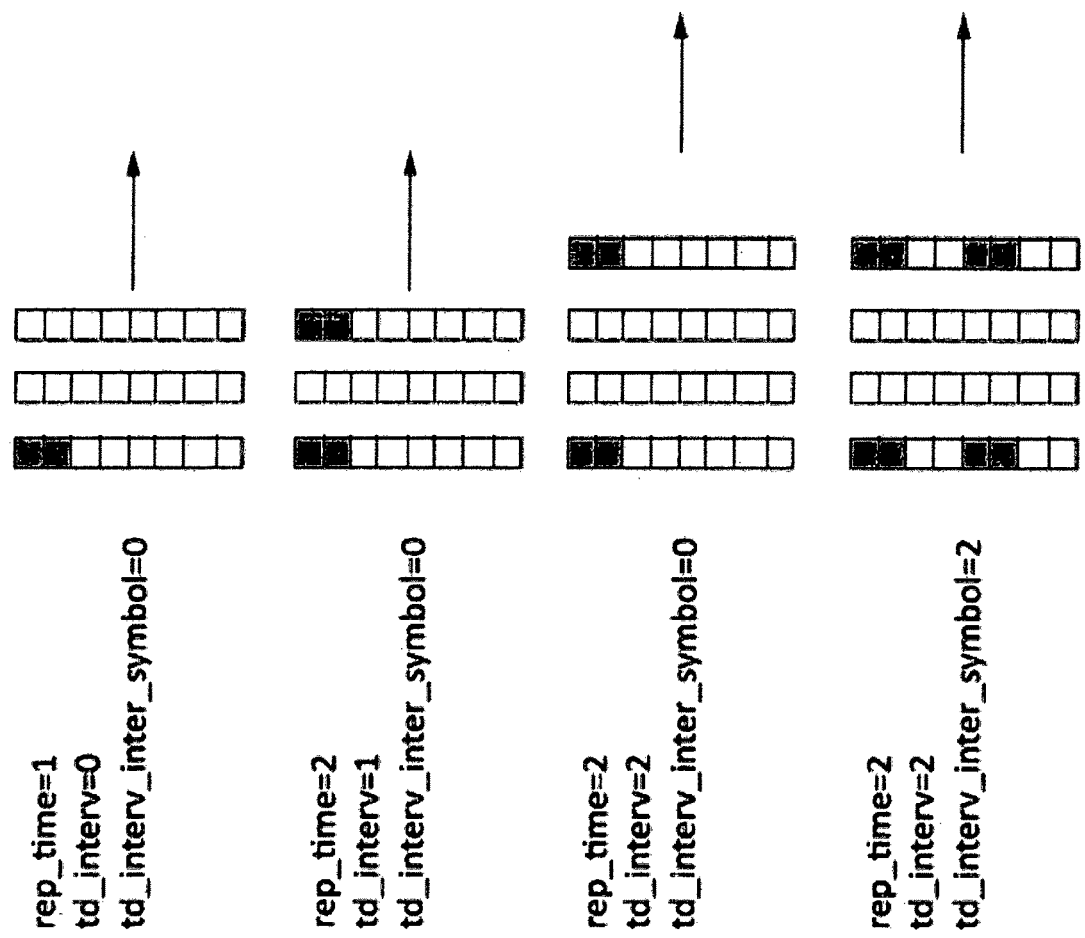
FIG. 11 shows examples of an alternative parameter set to describe a pattern sequence.

FIG. 11 shows other possible combinations of patterns which can also be used. The patterns can be based on one universal mother pattern where dependent insertion patterns are characterized by different parameters such as periodicity, separation between groups of reference signal for phase tracking, offset to the universal mother pattern, repetition of the patterns within a DFTsOFDM symbol, and/or other parameters.

An example of set of parameters describing the sequence is as follows, linked to the cases illustrated in FIG. 11, where $K_i = K = 2$ for $i = 0 \ldots N_k - 1$:

the number of repetition times (rep_time) can indicate how many signal blocks in the slot contain reference signal for phase tracking;

the parameter noted "td_interv" indicates how many signal blocks apart are the signal blocks in the slot containing reference signal for phase tracking; Di value when Di spans across signal blocks borders is:

$Di = [\text{remainder}(M/(K+td\_interv\_inter\_symbol))] + td\_interv\_inter\_symbol + M*td\_interv;$ the parameter TD interval within a symbol (noted td_interv_inter_symbol) indicates Di value when Di does not span across signal block borders.

The example of pattern embodiment shown in FIG. 7 commented above corresponds to parameters having the following values, when the value K=2 and the shift L=0 are supposed predetermined and/or known by both the emitter and the receiver:

rep_time=4,
td_interv=1,
td_interv_inter_symbol=4

The selectable patterns may have a few modes identified by reference signal for phase tracking densities: low, medium or high. Depending on the chosen modulation and coding scheme (MCS), one of the aforementioned modes can be associated with the chosen MCS. For example, QPSK can be associated with the low density mode while 16 QAM can be associated with the medium density mode. Any modulation order higher than 16 can be associated with the high density mode.

Figure 10:
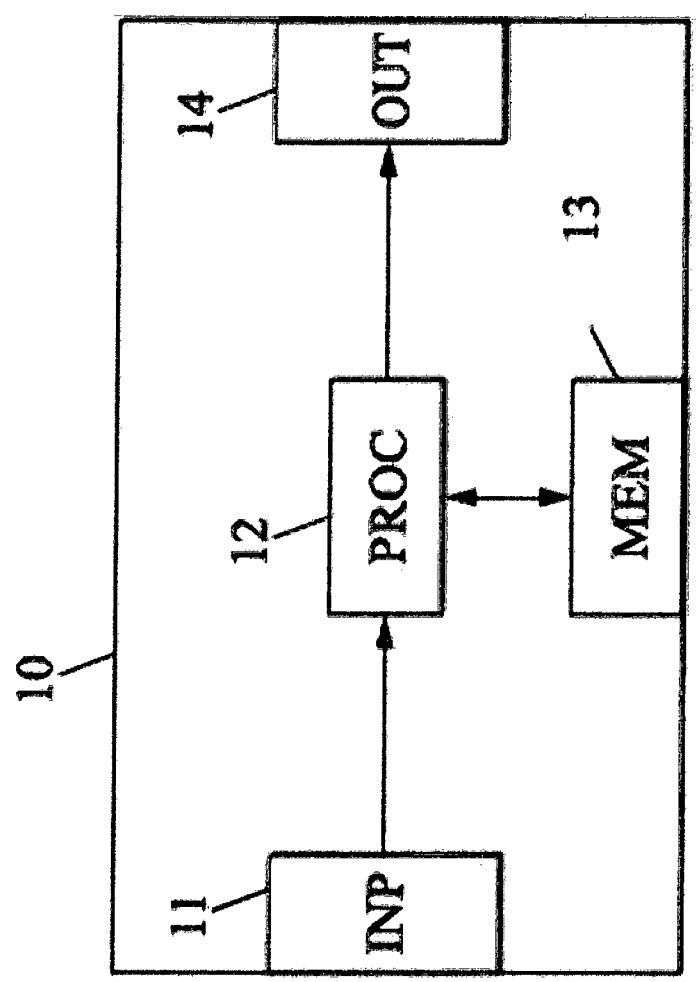
FIG. 10 is a possible embodiment for a device that enables the method of the present invention.

FIG. 10 is a possible embodiment for a device that enables the present invention.

In this embodiment, the device 10 can comprise a memory 13 to store computer program instructions loadable into a circuit and adapted to cause circuit 12 to carry out the steps of the present invention when the program instructions are run by the circuit 12. The memory 13 may also store temporary data and further useful information for carrying the steps of the present invention as described above.

The circuit 12 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for «Field-Programmable Gate Array»).

The aforesaid device 10 can be a terminal (such as a cellular telephone terminal) or simply a part of that terminal, implementing the invention within the context of the uplink communication towards a base station, or also the device 10 can be the base station as well (or a part of it).

Figure 12:
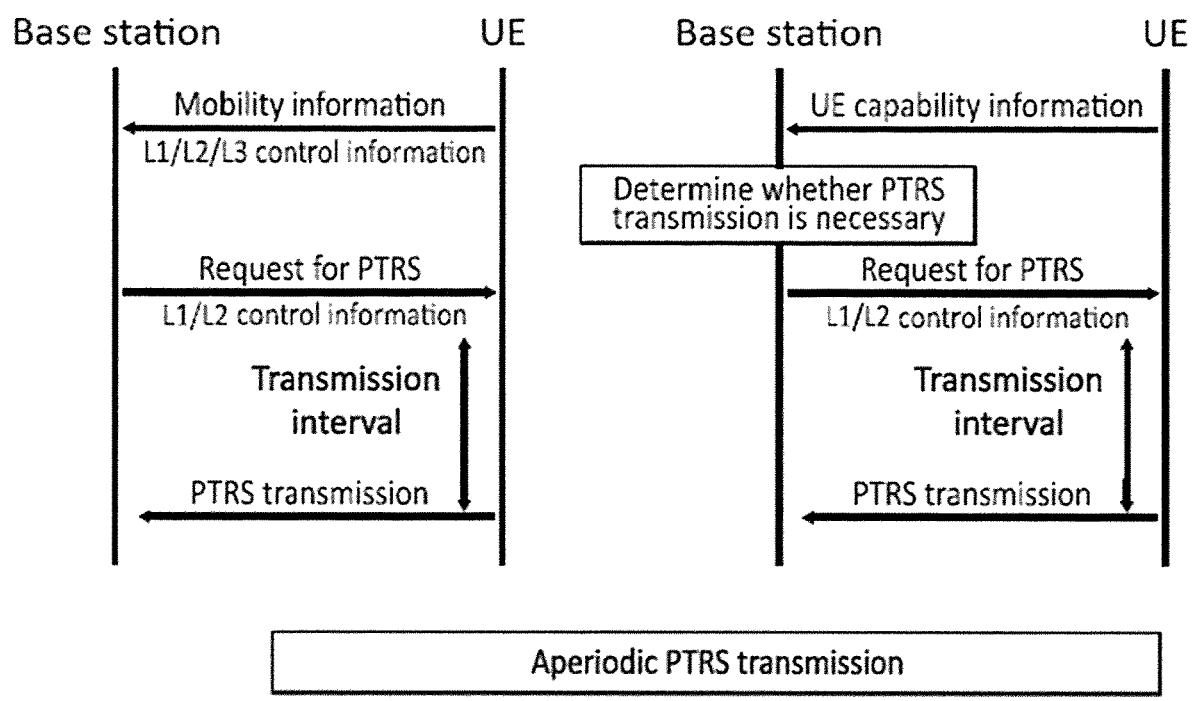
FIG. 12 shows different embodiments where the pattern insertion is chosen by a base station while the insertion of the reference signal for phase tracking is performed by a terminal UE, in the context of an uplink communication.
Figure 13:
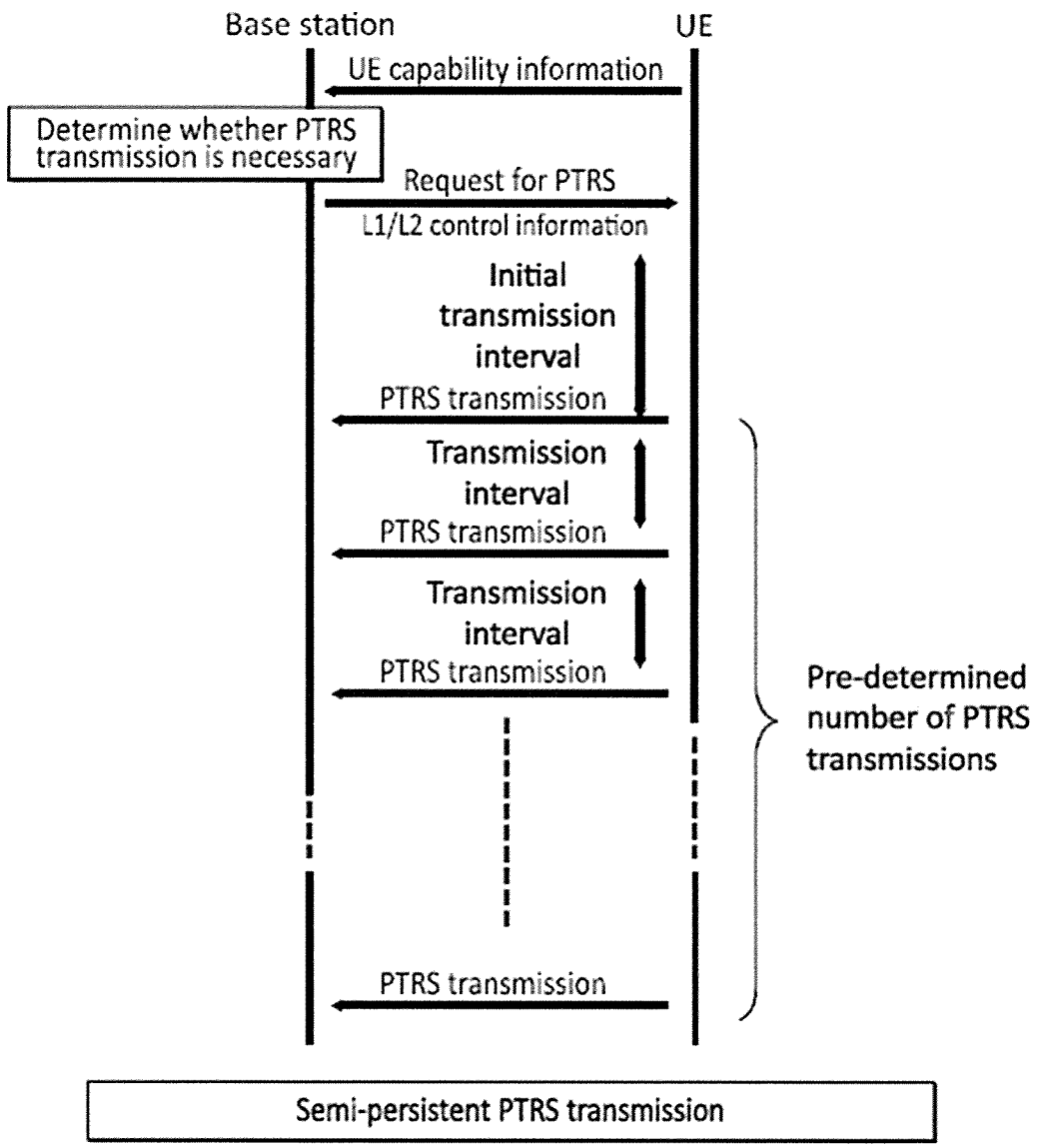
FIG. 13 shows different embodiments where the pattern insertion is chosen by a base station while the insertion of the reference signal for phase tracking is performed by a terminal UE, in the context of an uplink communication.
Figure 14:
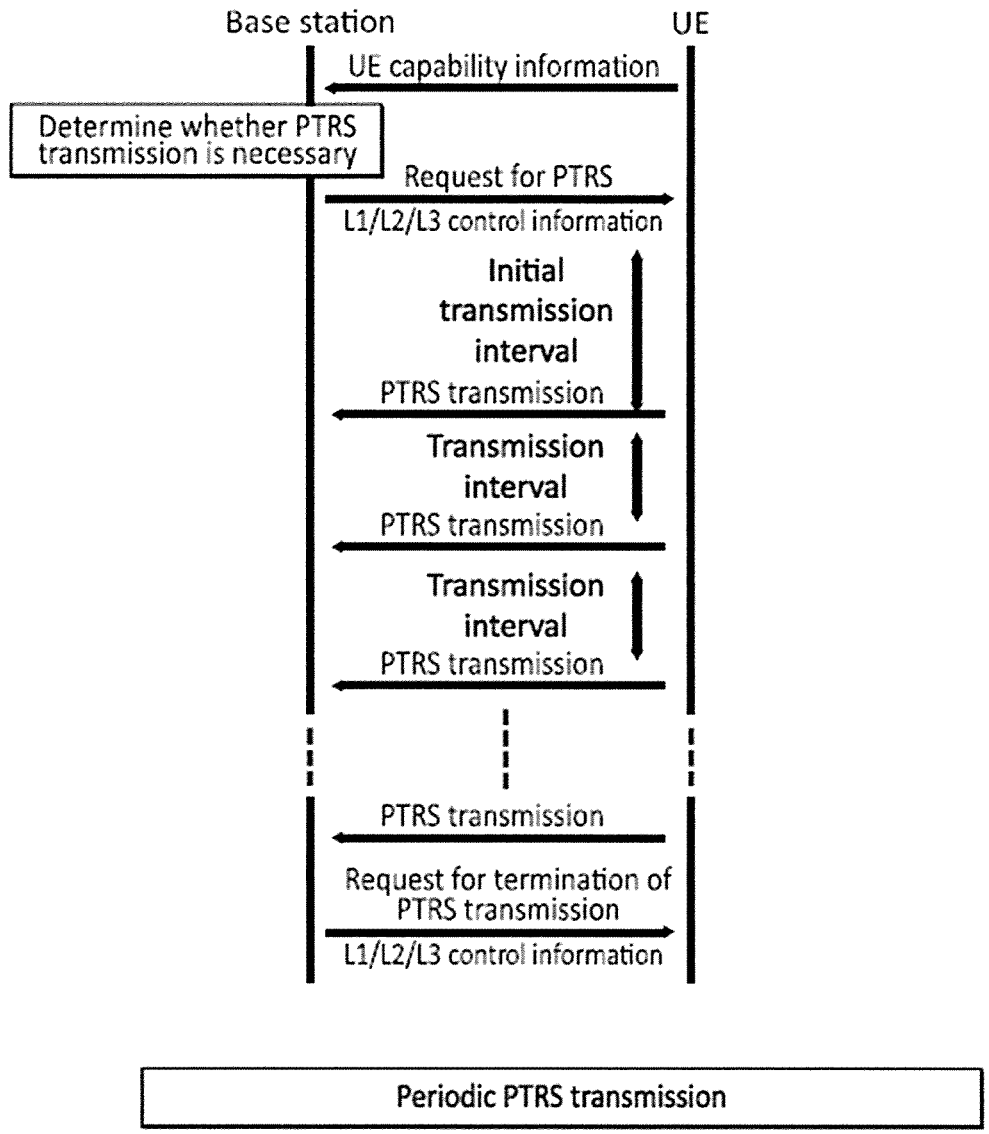
FIG. 14 shows different embodiments where the pattern insertion is chosen by a base station while the insertion of the reference signal for phase tracking is performed by a terminal UE, in the context of an uplink communication.

In the example of an uplink transmission (from a terminal UE (for "User Equipment") to a base station), compensation of time domain phase variations is to be performed at the receiver side (by the base station). To that end, the base station has to know which insertion pattern sequence was used by the terminal UE. In an embodiment shown in FIGS. 12 to 14, the terminal UE transmits to the base station information about communication conditions (such as for example mobility and/or capability of the terminal UE) and the base station chooses the insertion pattern based on the aforementioned criteria of communication conditions derived from the information received from the terminal UE. In FIGS. 12 to 14, references L1, L2, L3 designate the different layers through which control information is sent. L1 corresponds to physical layer, L2 corresponds to medium access control (MAC) layer, L3 corresponds to radio resource control (RRC) layer. Once the base station has chosen the appropriate pattern (or pattern sequence), the base station transmits to the terminal UE information allowing the UE to determine the chosen pattern for applying reference signal for phase tracking insertion at the terminal UE. For example, that information can be respective values of parameters as defined above: rep_time, td_interv, and td_interv_inter_symbol. For example, that information can be an on/off configuration of a pattern, or a density of a set of patterns that the terminal UE is capable of determining based on other transferred information such as modulation and coding rate and/or scheduled bandwidth. Alternatively, it can be also a succession of bits coding a pattern index in a pattern dictionary for example. In the embodiment in FIG. 11, one-shot insertion of reference signal for phase tracking is triggered through signaling: the terminal UE inserts reference signal for phase tracking one time, on request. The slot carrying reference signal for phase tracking is determined based on the time information given by the transmission interval (either predetermined or signalled).

Therefore, in this embodiment wherein the insertion of reference signal for phase tracking is performed by a terminal (UE) for an uplink transmission towards a base station:

the terminal transmits to the base station information about communication conditions, the base station derives from said information said predetermined criteria of communication conditions, the base station chooses the insertion pattern according to the predetermined criteria of communication conditions, and the base station transmits to the terminal (UE) information representative of the chosen pattern to be used for performing the insertion of reference signal for phase tracking at the terminal.

The present invention aims thus also at a system comprising a terminal and a base station both configured for performing the method according to this embodiment.

In the example shown in FIG. 12, the terminal UE can perform the insertion of reference signal for phase tracking according to the chosen pattern each time the base station deems it necessary. In the alternative embodiment shown in FIG. 13, the terminal UE can perform the insertion according to the chosen pattern repeatedly (for example periodically) a predetermined number of times (which can be coded also by the base station and transmitted to terminal UE). In another alternative embodiment shown in FIG. 14, the insertion of reference signal for phase tracking can be performed repeatedly by the terminal until the base station deems it unnecessary. The base station may then request the terminal to stop inserting reference signal for phase tracking, or alternatively to apply another insertion pattern for example.

The invention claimed is:

1. A method implemented by computer means of a communicating entity, for inserting a reference signal for phase tracking, said communicating entity using a discrete Fourier transformation spread orthogonal frequency division multiplexing modulator, characterized in that the method comprises:

obtaining a succession of signal samples by inserting said reference signal for phase tracking within a succession of data samples, according to at least one insertion pattern chosen among pre-defined patterns with respect to predetermined criteria of communication conditions, and feeding said modulator with a succession of signal blocks obtained from said succession of signal samples, so as to apply the discrete Fourier transformation after the insertion of the reference signal for phase tracking.

2. The method according to claim 1, wherein one of the predetermined criteria of communication conditions is at least one of the following:

scheduled bandwidth;
modulation;
coding rate;
carrier frequency;
physical resource block bundling; or
other reference signal densities.

3. The method according to claim 1, wherein a reference signal for demodulation is further inserted within a transformed succession of signal blocks resulting at least from the application of the discrete Fourier transformation to said succession of signal blocks, said reference signal for demodulation being inserted in scheduled positions of the transformed succession of signal blocks, and wherein said chosen pattern takes into account said scheduled positions.

4. The method according to claim 3, wherein said transformed succession of signal blocks includes $N_{data}$ transformed signal blocks, each transformed signal block being mapped to M active carriers, and wherein said chosen pattern is defined by $N_k$ groups of $K_i$ reference signal for phase tracking separated by $D_i$ data samples, such as:

$$\sum_{i=0}^{N_k-1} K_i + \sum_{i=0}^{N_k} D_i = MN_{data}$$

where $D_i$ are non-null positive integers when i is different from 0 and $N_k$.

5. The method according to claim 4, wherein: $D_0=D_{N_K}=0$.

6. The method according to claim 4, wherein: $D_1=D_2=\ldots=D_{N_{K-1}}$.

7. The method according to claim 4, wherein: $K_0=K_1=\ldots=K_{N_{K-1}}$.

8. The method according to claim 4, wherein:
$K_1=\ldots=K_{N_{K-2}}=K_0+K_{N_{K-1}}$.

9. The method according to claim 4, wherein: $(D_0+\Sigma_{i=0}^{k}(K_i+D_{i+1})) \bmod M = D_0 \bmod M$ for each k from 0 to $N_{k-2}$.

10. The method according to claim 4, wherein: $(\Sigma_{i=0}^{k}(D_i+K_i)) \bmod M = (D_0+K_0) \bmod M$ for each k from 0 to $N_{K-1}$.

11. The method according to claim 4, wherein $K_i+D_{i+1}=K_{Nk-1}+D_{Nk}+D_0=\Delta$ for each k from 0 to $N_{k-2}$, where either:

$\Delta=M$; or
$\Delta<M$; or
$\Delta>M$.

12. The method according to claim 4, wherein a non-null cyclic prefix, CP, is inserted after an inverse discrete Fourier transformation which is carried out by said modulator after the discrete Fourier transformation, and wherein $D_i$, i= 1 ... $N_{K-1}$, takes one of two values:

a chosen integer D', if $D_i$ does not span across two signal blocks, or

D''=D'−E($N_{CP}$*M/N), if $D_i$ spans across two signal blocks, where $N_{CP}$ corresponds to a number of CP samples appended after the inverse discrete Fourier transformation, and E(x) designates the closest integer to x, N corresponding to the number of subcarriers related to the inverse discrete Fourier transformation.

13. The method according to claim 4, wherein $D_i$ is chosen so as to avoid reference signal for phase tracking insertion in signal blocks having positions scheduled for reference signal for demodulation or for other reference signal allowing phase tracking.

14. A telecommunication device, using a discrete Fourier transformation spread orthogonal frequency division multiplexing modulator, wherein the device comprises a computer circuit for inserting a reference signal for phase tracking and:

obtaining a succession of signal samples by inserting said reference signal for phase tracking within a succession of data samples, according to at least one insertion pattern chosen among pre-defined patterns with respect to predetermined criteria of communication conditions, and feeding said modulator with a succession of signal blocks obtained from said succession of signal samples, so as to apply the discrete Fourier transformation after the insertion of the reference signal for phase tracking.

15. A non-transitory computer-readable medium, comprising instructions that, when executed by a processor, perform the method as claimed in claim 1.

* * * * *